(12) United States Patent
Ayub et al.

(10) Patent No.: US 9,747,217 B2
(45) Date of Patent: *Aug. 29, 2017

(54) DISTRIBUTED HISTORY BUFFER FLUSH AND RESTORE HANDLING IN A PARALLEL SLICE DESIGN

(71) Applicant: International Business Machines Corporation, Armonk, NY (US)

(72) Inventors: Salma Ayub, Austin, TX (US); Sundeep Chadha, Austin, TX (US); Michael J. Genden, Austin, TX (US); Cliff Kucharski, Austin, TX (US); Dung Q. Nguyen, Austin, TX (US); David R. Terry, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/727,531

(22) Filed: Jun. 1, 2015

(65) Prior Publication Data

US 2016/0328330 A1  Nov. 10, 2016

Related U.S. Application Data

(63) Continuation of application No. 14/706,815, filed on May 7, 2015.

(51) Int. Cl.
*G06F 3/06* (2006.01)
*G06F 12/08* (2016.01)
(Continued)

(52) U.S. Cl.
CPC ........ *G06F 12/0875* (2013.01); *G06F 3/0604* (2013.01); *G06F 3/0619* (2013.01); *G06F 3/0647* (2013.01); *G06F 3/0673* (2013.01); *G06F 12/0842* (2013.01); *G06F 12/0891* (2013.01); *G06F 9/3806* (2013.01);
(Continued)

(58) Field of Classification Search
CPC .. G06F 12/0875; G06F 3/0604; G06F 3/0619; G06F 3/0647; G06F 3/0673; G06F 2212/45; G06F 2212/62
See application file for complete search history.

(56) References Cited

U.S. PATENT DOCUMENTS 5,870,612 A    2/1999  Cheong et al.
6,070,235 A *  5/2000  Cheong ................. G06F 9/3824
                                                    712/218
(Continued)

OTHER PUBLICATIONS

Eisen et al., "Method and Apparatus for Recovery in a Microprocessor Having a Multi-Execution Slice Architecture," U.S. Appl. No. 14/883,253, filed Oct. 14, 2015, 46 pages.
(Continued)

*Primary Examiner* — Ann J Lo
*Assistant Examiner* — Michelle Taeuber
(74) *Attorney, Agent, or Firm* — VanLeeuwen & VanLeeuwen; Steven L. Bennett

(57) ABSTRACT

An approach is provided in which a computing system captures content included in a history buffer entry that corresponds to a flush ITAG. The computing system, in turn, uses an execution unit to transmit the content over a results bus to multiple registers and restore at least one of the registers accordingly.

7 Claims, 8 Drawing Sheets

(51) Int. Cl.
  *G06F 9/38* (2006.01)
  *G06F 12/0875* (2016.01)
  *G06F 12/0891* (2016.01)
  *G06F 12/0842* (2016.01)

(52) U.S. Cl.
  CPC ........ *G06F 9/3832* (2013.01); *G06F 2212/45* (2013.01); *G06F 2212/60* (2013.01); *G06F 2212/62* (2013.01)

(56) References Cited

U.S. PATENT DOCUMENTS

| | | | |
|---|---|---|---|
| 6,842,811 B2 | 1/2005 | Barry et al. | |
| 8,245,018 B2 * | 8/2012 | Nguyen | G06F 9/3863 712/244 |
| 2006/0004988 A1 * | 1/2006 | Jordan | G06F 9/3851 712/43 |
| 2008/0189535 A1 * | 8/2008 | Agarwal | G06F 9/3863 712/245 |
| 2010/0169622 A1 * | 7/2010 | Nguyen | G06F 9/3863 712/228 |
| 2011/0167247 A1 | 7/2011 | Gibbs et al. | |
| 2015/0324204 A1 | 11/2015 | Eisen et al. | |
| 2015/0324205 A1 | 11/2015 | Eisen et al. | |

OTHER PUBLICATIONS

Software Patent Institute et al., "Concurrency Control and Recovery in Multiprocessor Database Machines: Design and Performance Evaluation," IP.com No. IPCOM000161111D, Dec. 31, 1983, 219 pages.

Ayub et al., "Distributed History Buffer Flush and Restore Handling in a Parallel Slice Design," U.S. Appl. No. 14/706,815, filed May 7, 2015.

* cited by examiner

| History Buffer Entry 400 |||||  |
|---|---|---|---|---|---|
| RIP | ITAG | ETAG | RP | DATA | ... |
| Restore-in-Progress | ITAG of corresponding instruction | ITAG of evicting instruction | Recovery Pending bit | Results Data | |
| 410 | 420 | 430 | 440 | 450 | |

*FIG. 4*

DISTRIBUTED HISTORY BUFFER FLUSH AND RESTORE HANDLING IN A PARALLEL SLICE DESIGN

BACKGROUND

The present disclosure relates to an approach to restore a register with history buffer contents in a distributed history buffer architecture.

In traditional processors, a history buffer is a centralized component of an execution unit that preserves register contents when a register is a target of a newly dispatched instruction and the target register's contents require preservation, such as during a branch instruction. However, processors with distributed architectures may configure history buffers and registers in a distributed manner instead of a one-to-one configuration as in traditional processor designs. As such, processors with a distributed architecture require a substantial amount of ports, entries, and wires to connect history buffers to registers to support flush and restore operations.

BRIEF SUMMARY

According to one embodiment of the present disclosure, an approach is provided in which a computing system captures content included in a history buffer entry that corresponds to a flush ITAG. The computing system, in turn, uses an execution unit to transmit the content over a results bus to multiple registers and restore at least one of the registers accordingly.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein:

FIG. 4 is an exemplary diagram depicting control fields and data fields included in a history buffer entry;

DETAILED DESCRIPTION

Figure 1:
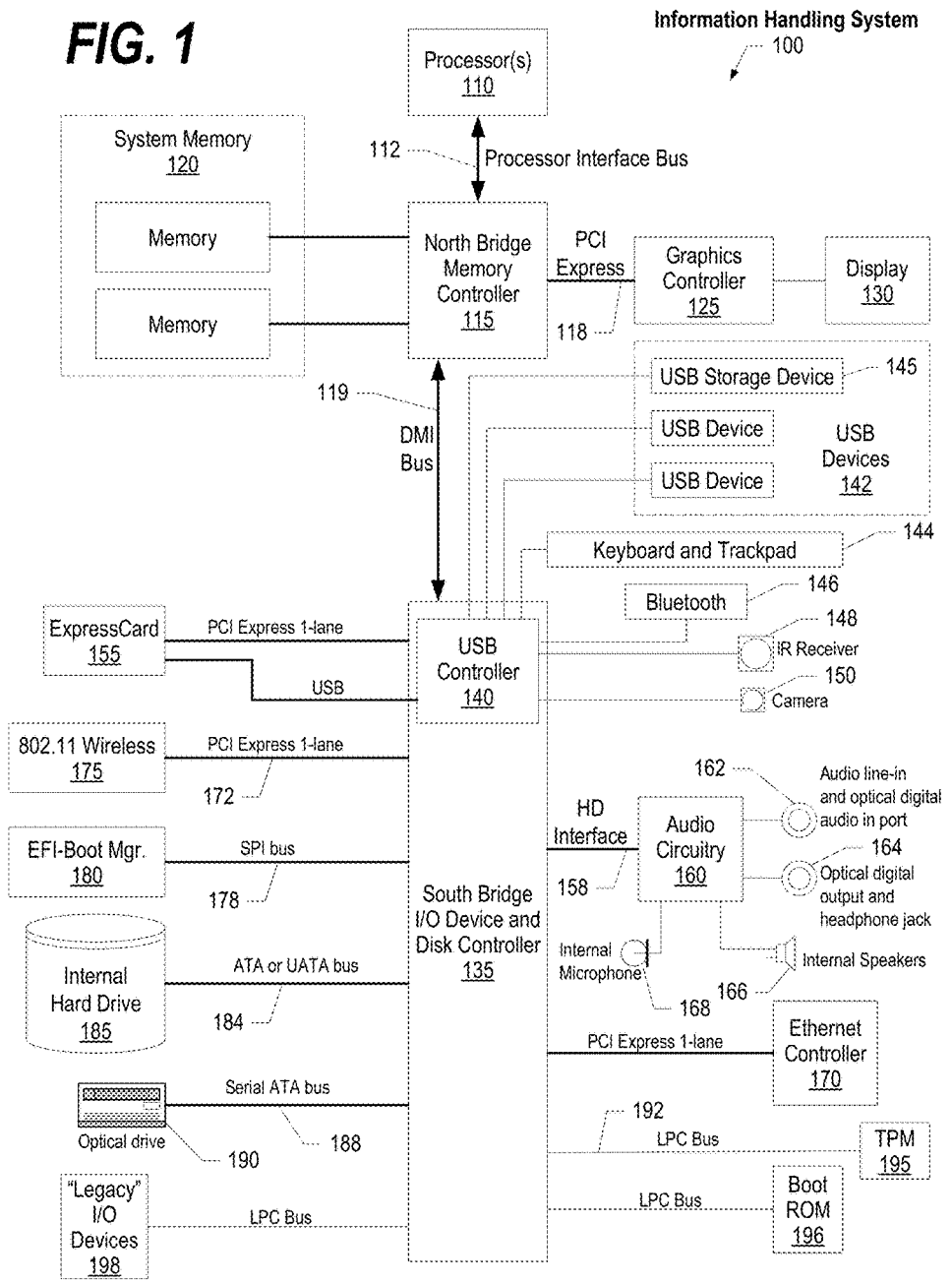
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

Figure 2:
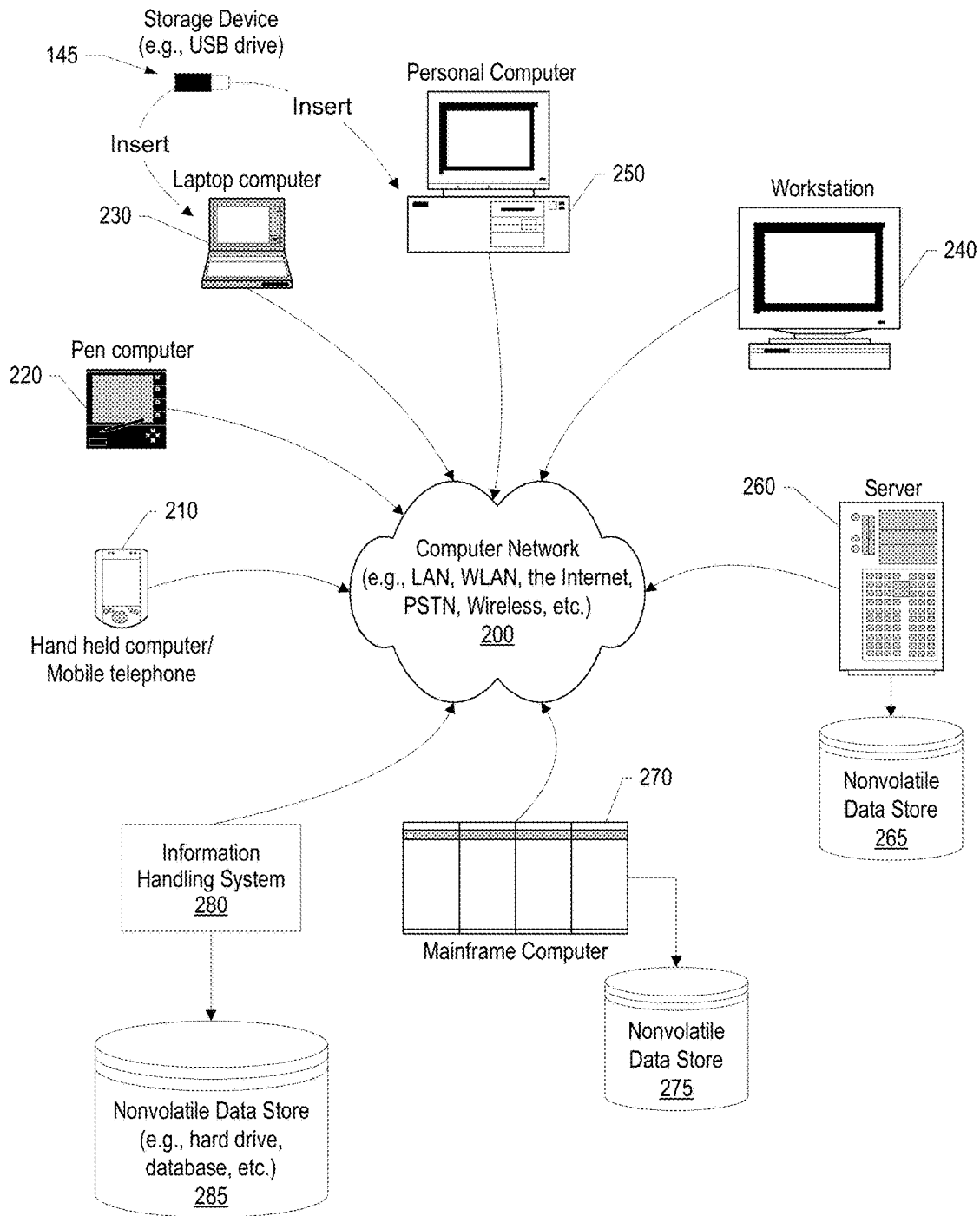
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
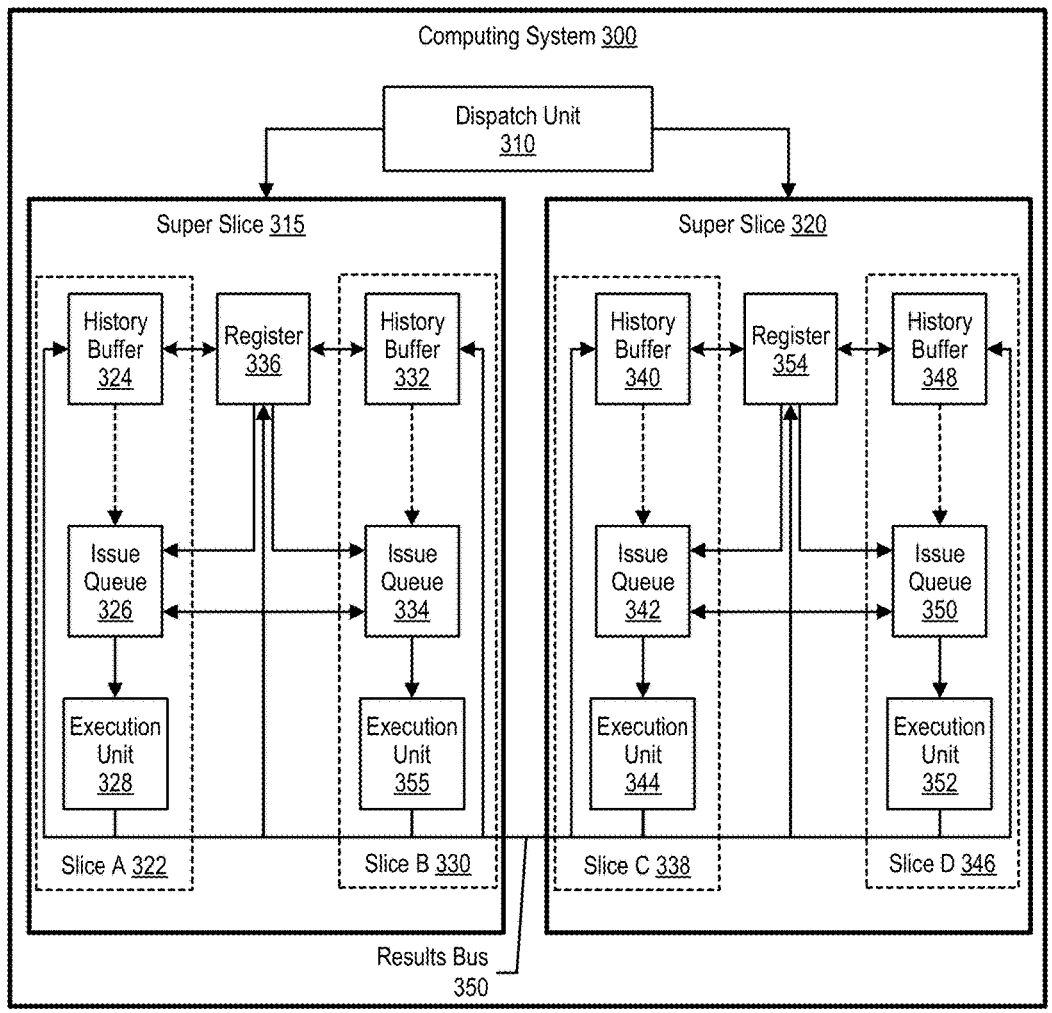
FIG. 3 is an exemplary diagram depicting a computing system that performs distributed history buffer flush and restore functions using an execution unit and a results bus.

FIG. 3 is an exemplary diagram depicting a computing system that performs distributed history buffer flush and restore functions using an execution unit and a results bus. Computing system 300, such as a processor or multi-processor, includes a distributed, multi-slice architecture that utilizes an execution unit results bus to distribute restore content to registers and other history buffers.

As discussed herein, computing system 300 passes restore content from a history buffer entry to a corresponding execution unit through an issue queue. The execution unit, in turn, transmits the restore content over results bus 350, which a register snoops and restores the register contents accordingly. As such, a history buffer in one super slice (e.g., history buffer 324) may seamless restore a register in a different super slice (e.g., register 354). As those skilled in the art can appreciate, computing system 300 may include more or less super slices than what is shown in FIG. 3, and each super slice may include more or less slices than what is shown in FIG. 3.

Computing system 300 includes two super slices 315 and 320, which includes two slices and a register. Super slice 315 includes register 336, slice A 322 and slice B 330. Each of the slices 322 and 330 include a history buffer (324, 332), issue queue (326, 334), and execution unit (328, 355).

Likewise, super slice 320 includes register 354, slice A 338 and slice B 346. Each of the slices 338 and 346 include a history buffer (340, 348), issue queue (342, 350), and execution unit (344, 352).

Dispatch unit 310 dispatches an instruction to one of issue queues 326, 334, 342, or 350. In one embodiment, each issue queue handles specific threads and dispatch unit 310 selects one of the issue queues based upon an instruction's targeted thread. At times, in one embodiment, the instruction may target one or more registers in registers 336 or 354 to store information. During these times, the current content within the targeted registers may require preservation (e.g., during a branch instruction). As such, the targeted registers store the existing content in one of the history buffers within their corresponding super slice, such as on a per-thread basis. For example, registers 336 may store existing content in history buffer 324 or history buffer 332 based upon the thread that evicted the current content. The current content includes control information, such as an instruction tag (ITAG), and may include results data of the corresponding instruction has completed execution and the results data is available (see FIG. 4 and corresponding text for further details).

At times, the registers may need to be restored to a prior state using the content stored in the history buffers. For example, computing system 300 may have predicted an incorrect branch and needs to restore to a state prior to the branch instruction. As such, an instruction Fetch Unit (IFU) consolidates flush requests into a single flush point (e.g., an oldest flush point), and then broadcasts a Flush Valid with a Flush ITAG.

Figure 5:
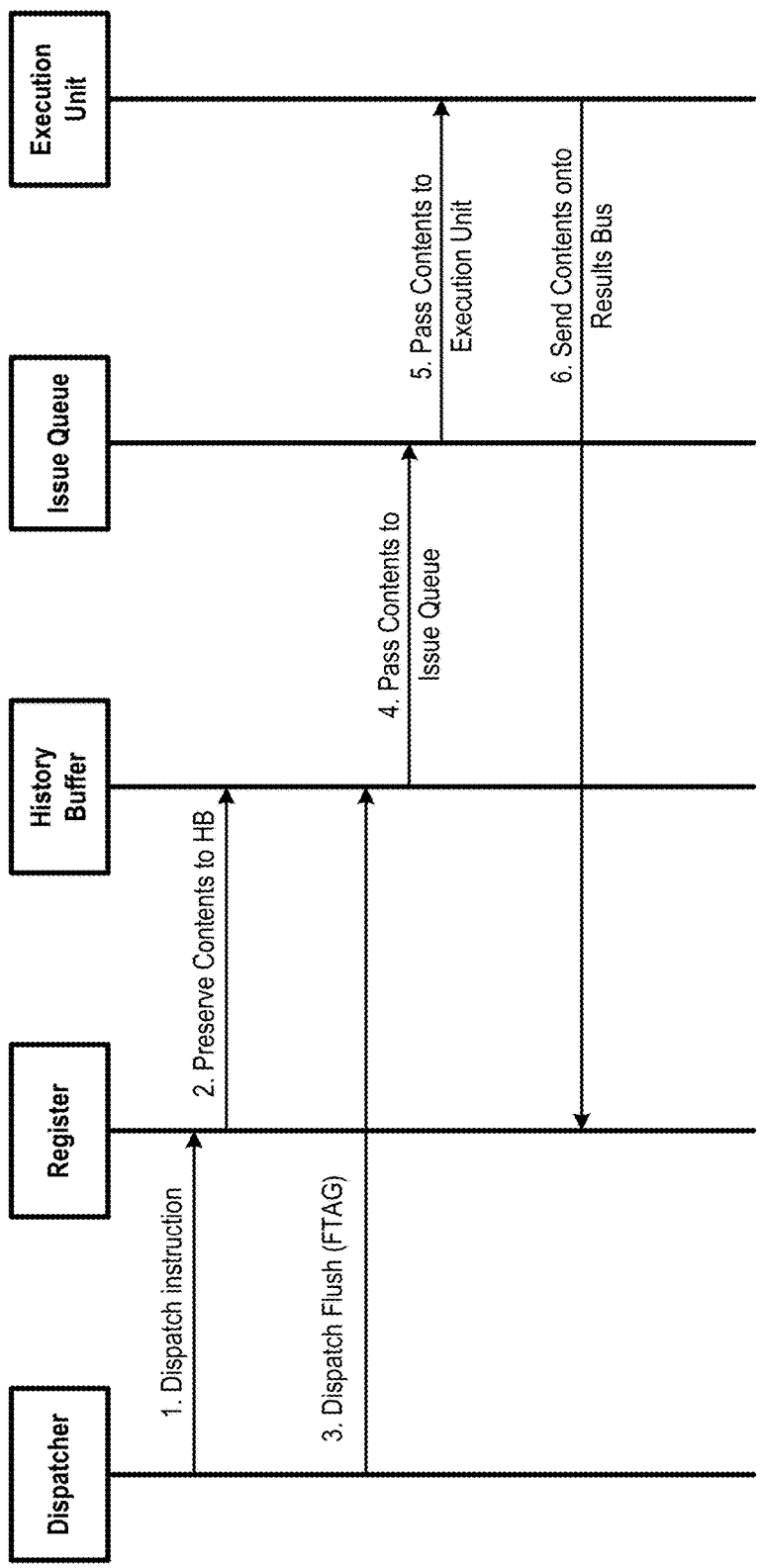
FIG. 5 is an exemplary diagram depicting a computer system preserving register contents in a history buffer and restoring the register contents by sending the register contents from the history buffer, to an issue queue, and to an execution unit that, in turn, transmits the contents over a results bus to the register.
Figure 8:
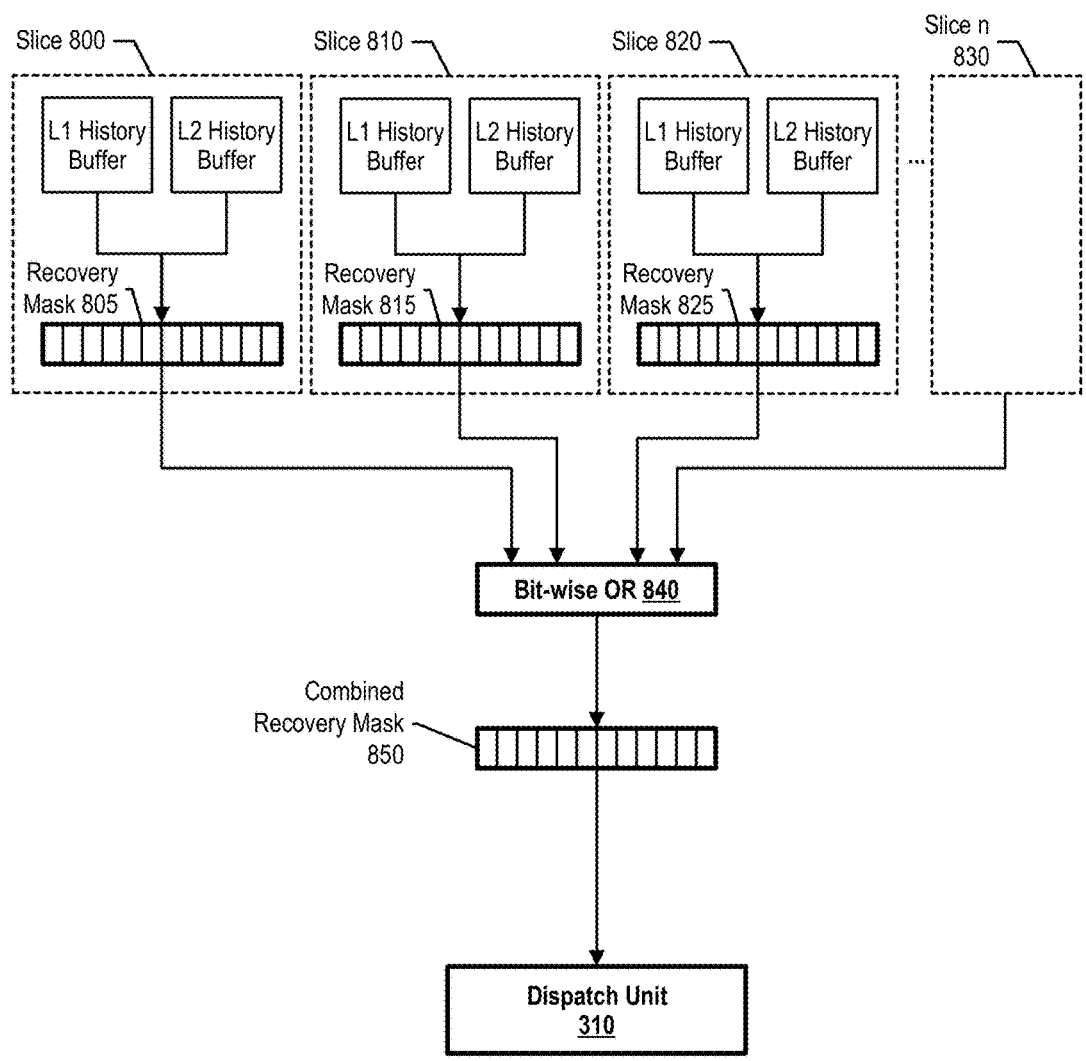
FIG. 8 is an exemplary diagram depicting an approach to inform a dispatch unit in a multi-slice computer system of threads in process of a flush operation.

When a flush ITAG (FTAG) occurs, computing system 300 identifies history buffer entries based upon relationships between the FTAG, an instruction tag (ITAG), and an evictor tag (ETAG) (see FIGS. 5, 8, and corresponding text for further details). The content is read from each identified history buffer entry and sent to an issue queue within the history buffer's slice. For example, history buffer 324 sends matching recovery content to issue queue 326 and history buffer 332 sends matching recovery content to issue queue 334.

The issue queues detects, via an arbitration process, that the content corresponds to a restore operation and, in turn, the issue queue passes the recovery content to a respective execution unit within the slice. For example, issue queue 326 sends recovery content to execution unit 328.

The execution units recognize that the content is recovery content and, in turn, transmits the recovery content onto results bus 350. In one embodiment, the history buffer detects if it has any registers to restore. If so, the history buffer sends a "recovery request" to the issue queue and the issue queue provides a "recovery grant" back to the history buffer. With the grant, the contents of the selected history buffer entry are passed to the issue queue and onto the execution unit. As such, the execution unit reflects the source data (instruction input data, which is the register content of the HB entry we're restoring) onto results bus 350.

Results bus 350 distributes the content to computing system's history buffers and registers using existing wiring, which reduces the wiring complexities of computing system 300. In turn, a register may snoop the results bus and restore a register. In one embodiment, FIG. 4 is an exemplary diagram depicting control fields and data fields included in a history buffer entry. Multiple history buffer entries 400 are included in a history buffer and include control fields and results data fields. As those skilled in the art can appreciate, a history buffer entry may have more or less control fields than what is shown in FIG. 4.

A history buffer sets restore in progress field 410 when the history buffer sends an entry to the issue queue without all the results data included. RIP field 410 stores a marker that indicates the entry is subject to the restore delay period discussed herein if the write back results data arrive during the restore delay period. RIP field bit functions include:

SET when an entry is sent to the issue queue and the history buffer entry did not include the entirety of the results data.

IF (no write back occurs to a RIP=1 entry during restore delay period) THEN clear RIP bit at the end of the restore delay period IF (write back occurs to a RIP=1 entry during the restore delay period expires) THEN 1. Set the recovery pending bit (RP, discussed below) back to '1' to indicate the entry needs to be restored again, and 2. When the second restore occurs, clear both the RP and RIP bits);

ITAG field 420 includes an ITAG corresponding to the instruction of the content included in the history buffer entry. As such, when results data is available for an executed instruction, the results data is stored in data fields 450 of the history buffer entry that includes the corresponding ITAG in field 410. ETAG 430 is includes an instruction tag of the instruction that evicted the corresponding recovery content. Recovery pending bit 440 is set when the history buffer entry's contents are in process of being restored to a register.

FIG. 5 is an exemplary diagram depicting a computer system preserving register contents in a history buffer and restoring the register contents by sending the register contents from the history buffer, to an issue queue, and to an execution unit that, in turn, transmits the contents over a results bus to the register.

The dispatch unit dispatches an instruction that targets a register (1). When the dispatched instruction is, for example, a branch instruction, the register preserves the original register contents in the history buffer (2). At a later point in time, the dispatch unit issues a flush ITAG (3), such as in response to an incorrectly predicted branch instruction. The history buffer identifies the history buffer entry that includes the contents to be restored, and passes the restore contents to the issue queue (4).

The issue queue passes the restore contents to the execution unit (5). The execution unit sends the restore contents on the results bus, which distributes the restore contents to the registers in the computer system (6). In turn, the register snoops the results contents off the results bus and restores the register accordingly.

Figure 6:
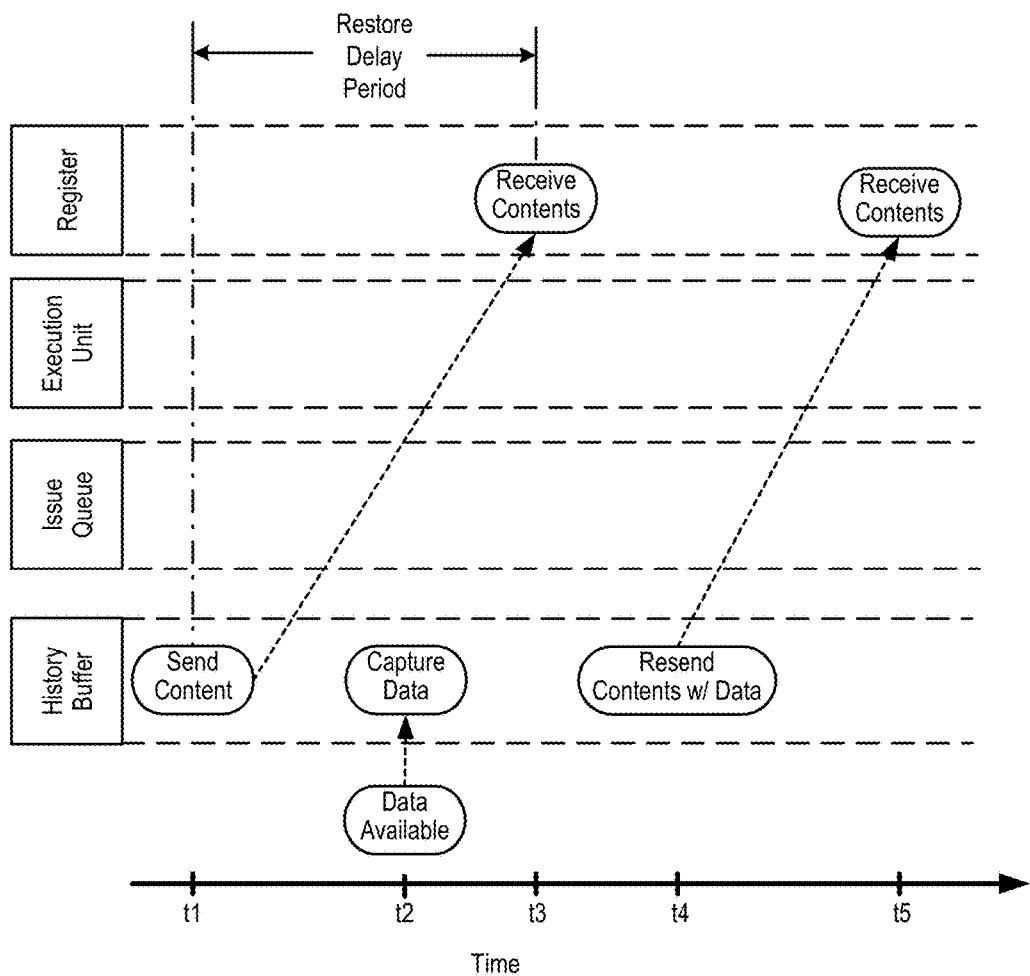
FIG. 6 is an exemplary timing diagram depicting a computing system re-transmitting content from a history buffer to an execution in response to the history buffer receiving results data during a restore delay period.

FIG. 6 is an exemplary timing diagram depicting a computing system re-transmitting content from a history buffer to an execution in response to the history buffer receiving results data during a restore delay period.

During a restore operation, history buffer entry content is sent from the history buffer, starting at time t1, to the issue queue, to the execution unit, onto the results bus, and finally being restored by a register at time t3. The time from the content restoration initiation (t1) to restoring the register is referred to herein as a restore delay period. When the history buffer entry content does not include results data, such as when results are not yet available for an instruction, the history buffer monitors whether the results data becomes available during the restore delay time period. When the data is not available until after the restore delay time period, the register snoops the results bus and collects the restore data accordingly.

FIG. 6 shows a situation when the restore data is available during the restore delay period. When the data is available at time t2, the history buffer captures the data. The history buffer updates the restore data and re-transmits updated restore data at time t4, which includes the restore control information and results data. As such, the updated content passes through the issue queue, execution unit, and onto the results bus whereupon the register updates at time t5 with the updated restore contents.

Figure 7:
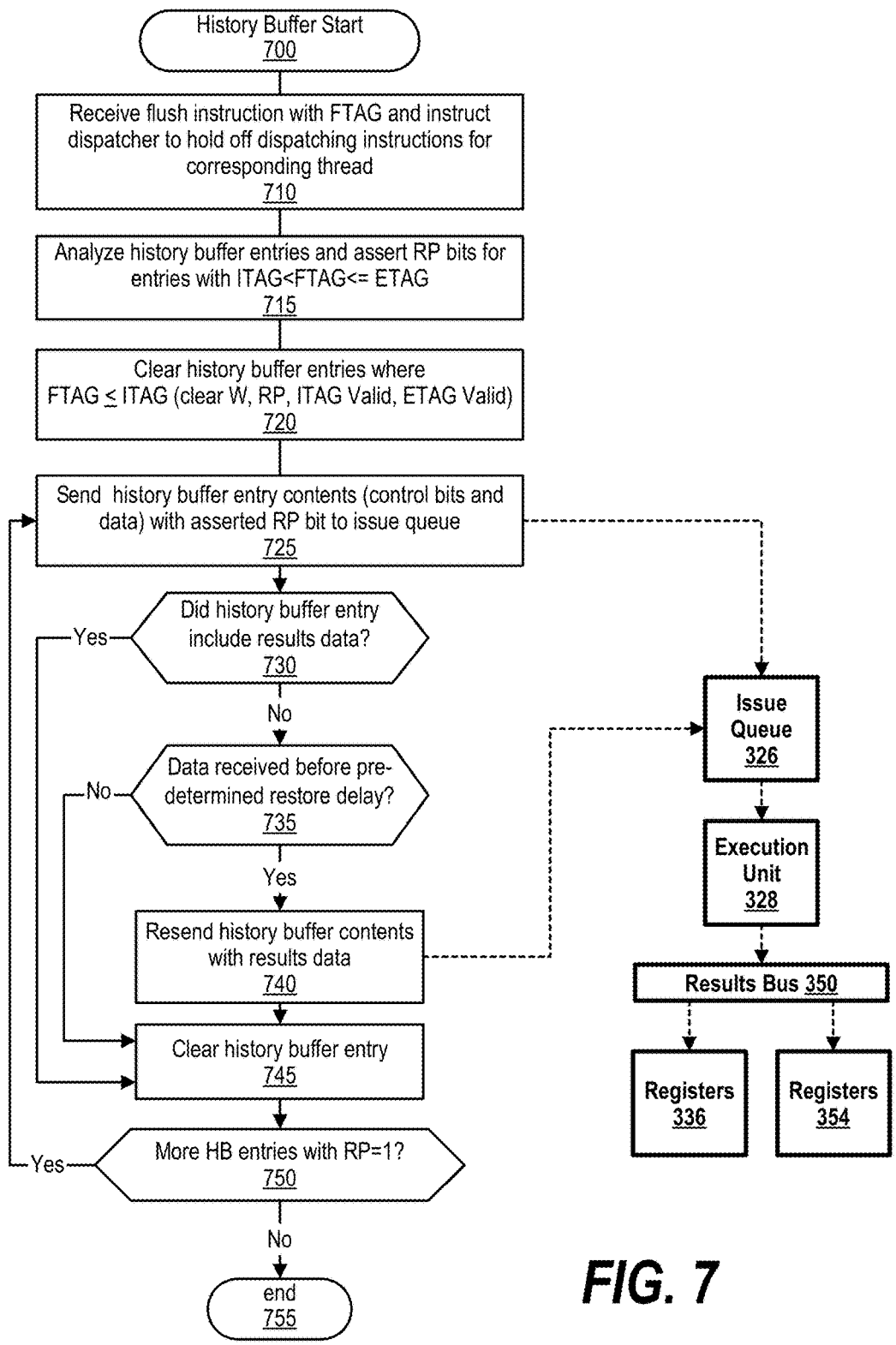
FIG. 7 is an exemplary flowchart depicting steps taken by a computing system to restore a register.

FIG. 7 is an exemplary flowchart depicting steps taken by a computing system to restore a register. Processing commences at 700, whereupon, at step 710, the process receives a flush instruction (FTAG) and instructs a dispatch unit to discontinue dispatching instructions for a thread corresponding to the flush ITAG. At step 715, the process analyzes history buffer entries and asserts recovery pending (RP) bits for entries whose ITAG and ETAG correspond to the FTAG such that ITAG<FTAG<=ETAG.

At step 720, the process clears history buffer entries where the FTAG<ITAG, such as clearing write (W) bits, recovery pending (RP) bits, ITAG valid bits, and ETAG valid bits. In one embodiment, the flush point (FTAG) indicates the ITAG of an instruction that failed or got corrupted and causes the system to restore the state of the machine to a state it was before execution of the failed or corrupt instruction. As such, when the FTAG<history buffer ITAG, the history buffer entry was younger (newer) than the flush point and further along in the program execution than where the fault occurred. At step 725, the process sends history buffer entry content, such as control bits and results data if available to an issue queue (e.g., issue queue 326).

The process determines as to whether the history buffer contents include data (decision 730). If the history buffer contents included data, then decision 730 branches to the 'yes' branch. On the other hand, if the history buffer content does not include results data, but rather just control bits, then decision 730 branches to the 'no' branch. The process determines as to whether the history buffer receives data during the restore delay period such as that shown in FIG. 6 (decision 735). If the history buffer did not receive data during the restore delay period, then decision 735 branches to the 'no' branch. On the other hand, if the history buffer receives data before the restore delay period, then decision 735 branches to the 'yes' branch, whereupon, at step 740, the process resends the history buffer contents with the results data. At step 745, the process clears the history buffer entry.

The process determines as to whether more history buffer entries have an asserted recovery pending bit (decision 750). If more history buffer entries have RP=1, then decision 750 branches to the 'yes' branch to process additional history buffer entries. On the other hand, if there are no more history buffer entries that have RP=1, then decision 750 branches to the 'no' branch. FIG. 7 processing thereafter ends at 755.

FIG. 8 is an exemplary diagram depicting an approach to inform a dispatch unit in a multi-slice computer system of threads in process of a flush recovery operation. In one embodiment, the flush recovery might be slow and impact overall thread performance. As such, a computing system may discontinue dispatching instructions for threads that are in process of restoring registers, and focus on dispatching instructions for threads that are not restoring registers.

FIG. 8 shows slices 800, 810, 820, and 830, each including multiple history buffers. The history buffers with recovery pending bits generate a 32-bit mask per slice (recovery masks 805, 815, and 825), which are bit wise OR'd (840) to form combined recovery mask 850. Dispatch unit 320 stores combined recovery mask 850 as a table of all the registers that are in process of being recovered. In turn, in this embodiment, the dispatch unit refrains from dispatching instructions targeted to threads with current flush activity, but continues to dispatch instructions targeted to threads without current flush activity.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:
    sending recovery content included in a history buffer entry to an issue queue, wherein the history buffer entry corresponds to a flush instruction tag (ITAG), and wherein the recovery content comprises the history buffer entry in its entirety that includes register contents from a previous state;
    passing the recovery content from the issue queue to an execution unit in response to the issue queue determining that the recovery content corresponds to a restore operation;
    transmitting, by the execution unit included in the processor, the recovery content to a plurality of registers over a results bus; and
    restoring at least one of the plurality of registers with the recovery content.

2. The method of claim 1 wherein the history buffer entry is included in a history buffer.

3. The method of claim 2 further comprising:
    receiving, at the history buffer, results data corresponding to the flush ITAG subsequent to sending the recovery content to the issue queue and before a pre-determined restore delay period;
    updating the recovery content to include the results data; and
    transmitting the updated recovery content to the plurality of registers.

4. The method of claim 1 wherein the information handling system further comprises:
    a plurality of slices, each one of the plurality of slices comprising one of a plurality of history buffers, one of a plurality of issue queues, and one of a plurality of execution units; and one or more super slices that each include the plurality of slices and one of the plurality of registers.

5. The method of claim 4 further comprising:
transmitting the recovery content from the execution unit residing on a first one of the one or more super slices to the one of the plurality of registers that reside on a second one of the one or more super slices.

6. The method of claim 1 further comprising:
identifying a first thread, from a plurality of threads, that corresponds to the flush ITAG; and
setting a recovery mask bit that corresponds to the first thread, wherein the recovery mask bit informs a dispatch unit included in the processor to discontinue dispatching instructions targeted to the first thread.

7. The method of claim 6 further comprising:
dispatching an instruction corresponding to a second one of the plurality of threads while the dispatcher is discontinuing dispatching instructions targeted to the first thread.

* * * * *